(12) United States Patent
Ionel et al.

(10) Patent No.: US 7,307,366 B2
(45) Date of Patent: *Dec. 11, 2007

(54) BRUSHLESS PERMANENT MAGNET MACHINE WITH AXIAL MODULES OF ROTOR MAGNETIZATION SKEW AND METHOD OF PRODUCING THE SAME

(75) Inventors: Dan M. Ionel, Fox Point, WI (US); Stephen J. Dellinger, Houston, OH (US)

(73) Assignee: A.O. Smith Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/464,293

(22) Filed: Aug. 14, 2006

(65) Prior Publication Data

US 2006/0290220 A1    Dec. 28, 2006

Related U.S. Application Data

(60) Continuation of application No. 11/071,950, filed on Mar. 4, 2005, now Pat. No. 7,143,503, which is a division of application No. 10/626,326, filed on Jul. 24, 2003, now Pat. No. 6,867,525.

(51) Int. Cl.
*H02K 1/27* (2006.01)
*H02K 21/12* (2006.01)

(52) U.S. Cl. .................. 310/156.47; 310/211

(58) Field of Classification Search .......... 310/211, 310/212, 156.47, 166; 29/596–598, 606, 29/608, 732

See application file for complete search history.

(56) References Cited

U.S. PATENT DOCUMENTS

| 1,861,059 | A | 5/1932 | Johnson |
| 4,095,161 | A | 6/1978 | Heine |
| 4,475,051 | A | 10/1984 | Chai |
| 4,638,195 | A | 1/1987 | Lin |

(Continued)

FOREIGN PATENT DOCUMENTS

DE    8907902    10/1990

(Continued)

OTHER PUBLICATIONS

U.S. Appl. No. 11/462,526, filed Aug. 4, 2006, Ionel et al.

(Continued)

*Primary Examiner*—Tran Nguyen
(74) *Attorney, Agent, or Firm*—Michael Best & Friedrich LLP

(57) ABSTRACT

An electrical machine having a machine output rating. The electrical machine including a shaft rotatable about an electrical machine axis, a rotor coupled to the shaft and rotating with the shaft, and a stator including a stator core. The rotor is configurable to include a first rotor portion having a relation to a first output rating and a second rotor portion having a relation to a second output rating. The stator core is configurable to be disposed adjacent to the first rotor portion relative to the machine axis when the machine output rating corresponds to the first output rating and adjacent to the second rotor portion when the machine output rating corresponds to the second output rating.

30 Claims, 12 Drawing Sheets

U.S. PATENT DOCUMENTS

| | | | |
|---|---|---|---|
| 4,642,502 A | 2/1987 | Carpenter et al. | |
| 4,672,253 A | 6/1987 | Tajima et al. | |
| 4,758,752 A | 7/1988 | Leenhouts | |
| 4,841,186 A | 6/1989 | Feigel et al. | |
| 4,874,975 A | 10/1989 | Hertrich | |
| 4,933,584 A | 6/1990 | Harms et al. | |
| 4,983,867 A | 1/1991 | Sakamoto | |
| 5,034,642 A * | 7/1991 | Hoemann et al. | 310/156.47 |
| 5,086,245 A | 2/1992 | Sieja et al. | |
| 5,173,651 A | 12/1992 | Buckley et al. | |
| 5,250,867 A | 10/1993 | Gizaw | |
| 5,306,976 A | 4/1994 | Beckman | |
| 5,315,192 A | 5/1994 | Satomi | |
| 5,386,161 A | 1/1995 | Sakamoto | |
| 5,444,316 A | 8/1995 | Ohya et al. | |
| 5,523,637 A | 6/1996 | Miller | |
| 5,532,531 A | 7/1996 | Sakamoto | |
| 5,757,100 A | 5/1998 | Burgbacher | |
| 5,760,520 A | 6/1998 | Hasebe et al. | |
| 5,773,908 A | 6/1998 | Stephens et al. | |
| 5,801,478 A | 9/1998 | Nashiki | |
| 5,847,479 A | 12/1998 | Wang et al. | |
| 5,923,111 A | 7/1999 | Eno et al. | |
| 5,942,873 A | 8/1999 | Nakano | |
| 6,104,117 A | 8/2000 | Nakamura et al. | |
| 6,160,330 A | 12/2000 | Sakamoto | |
| 6,172,438 B1 | 1/2001 | Sakamoto | |
| 6,329,729 B1 | 12/2001 | Sakamoto | |
| RE37,576 E | 3/2002 | Stephens et al. | |
| 6,384,503 B1 * | 5/2002 | Iwaki et al. | 310/156.47 |
| 6,462,452 B2 | 10/2002 | Nakano et al. | |
| 6,657,349 B2 | 12/2003 | Fukushima | |
| 6,670,732 B2 | 12/2003 | Sakamoto | |
| 6,674,187 B2 | 1/2004 | Isozaki et al. | |
| 6,707,209 B2 * | 3/2004 | Crapo et al. | 310/156.43 |
| 6,741,006 B2 | 5/2004 | Sakamoto | |
| 6,853,105 B2 | 2/2005 | Nakano et al. | |
| 6,867,524 B2 | 3/2005 | Liang | |
| 6,867,525 B2 * | 3/2005 | Ionel et al. | 310/156.47 |
| 6,906,443 B2 | 6/2005 | Luo et al. | |
| 6,940,198 B2 | 9/2005 | Ionel et al. | |
| 7,084,540 B2 | 8/2006 | Brahmavar et al. | |
| 7,098,567 B2 * | 8/2006 | Ionel et al. | 310/216 |
| 7,143,503 B2 * | 12/2006 | Ionel et al. | 29/596 |

FOREIGN PATENT DOCUMENTS

| | | |
|---|---|---|
| EP | 0413183 | 2/1991 |
| EP | 0473534 | 3/1992 |
| EP | 0532769 | 3/1993 |
| EP | 0549427 | 6/1993 |
| JP | 62018953 | 1/1987 |
| WO | WO 0241471 | 5/2002 |

OTHER PUBLICATIONS

Article entitled "Let's Solve the Problem: Rotor Skew Can Produce Axial Thrust on Shaft," Electrical Apparatus, The Magazine of Electromechanical & Electronic Application & Maintenance. A Barks Publication, p. 4, Nov. 2005.

Nicola Bianchi and Silverio Bolognani, "Design Techniques for Reducing the Cogging Torque in Surface-Mounted PM Motors," IEEE Transactions on Industry Applications, vol. 38, No. 5, pp. 1259-1265, Sep./Oct. 2002.

Jian Luo Surong Huang, Franco Leonardi, and Thomas A. Lipo, "A General Approach to Sizing and Power Density Equations for Comparison of Electrical Machines," IEEE Transactions on Industry Applications, vol. 34, No. 1, pp. 92-97, Jan./Feb. 1998.

Olorunfeni Ojo (Dept. of Electr. Eng., Tennessee Technol. Univ., Cookeville, TN), "Multiobjective Optimum Design of Electrical Machines for Variable Speed Motor Drives," Conference Record of the 1991 IEEE Industry Applications Society Annual Meeting, pp. 163-168, Sep./Oct. 1991.

* cited by examiner

BRUSHLESS PERMANENT MAGNET MACHINE WITH AXIAL MODULES OF ROTOR MAGNETIZATION SKEW AND METHOD OF PRODUCING THE SAME

RELATED APPLICATIONS

This application is a continuation of U.S. patent application Ser. No. 11/071,950, filed on Mar. 4, 2005 now U.S. Pat. No. 7,143,503; which is a divisional of U.S. patent application Ser. No. 10/626,326, filed on Jul. 24, 2003, issued as U.S. Pat. No. 6,867,525; both of which are incorporated herein by reference.

FIELD OF THE INVENTION

The invention relates to a brushless permanent magnet machine with axial modules of rotor magnetization skew and method of producing the same.

BACKGROUND

Electrical machines, such as brushless permanent magnet (BLPM) motors, typically encounter problems with cogging and ripple torque, both of which cause noise and vibration and can negatively affect the motor starting performance. The sum of the cogging and ripple torque components is defined as the electrical machine pulsating torque. Ripple torque is characterized as a cyclical variation in a delivered torque to a load caused by the interaction of the rotor magnetic field with harmonics in the stator current magnetomotive forces (mmf's). Cogging torque describes the non-uniform torque as a result of the interaction of the rotor magnetization and angular variations in an air gap permeance (or reluctance) associated with the shape of the slots of the stator. By definition, no stator excitation is involved in cogging torque production. There is a demand for an electric motor that minimizes the effect of cogging and ripple torque and that exhibits smooth operation. Further, there is a demand for an electrical machine having a rotor operable to provide a plurality of power or motor ratings for a given motor frame, and thereby reduce tooling costs and inventory. Further, there is a demand for an electrical machine to be easily configurable for operation with different combinations of the number of phases and poles.

SUMMARY

In one embodiment, the invention provides an electrical machine having a machine output rating. The electrical machine includes a shaft rotatable about an axis, a rotor mounted or coupled to the shaft and rotating with the shaft, and a stator including a stator core and windings. The rotor is configurable to include a first rotor portion having a relation to a first output rating and a second rotor portion having a relation to a second output rating. The stator core is configurable to be disposed adjacent to the first rotor portion when the machine output rating corresponds to the first output rating and adjacent to the second rotor portion when the machine output rating corresponds to the second output rating.

In another embodiment, the invention provides an electrical machine that can be set up for operation in one of a plurality of modes including a first mode wherein the electrical machine includes a first machine output rating and a second mode where the electrical machine includes a second machine output rating. The second machine output rating is different than the first machine output rating. The electrical machine includes a shaft rotatable about an electrical machine axis, a rotor mounted or coupled to the shaft and rotating with the shaft, and a stator including a stator core and windings. The rotor is a first rotor in the first mode and a second rotor in the second mode. The first rotor has a first rotor length and/or a first magnetization pattern corresponding to the first machine output rating. The second rotor has a second rotor length and/or a second magnetization pattern corresponding to the second output rating. The stator core is a first core in the first mode and a second core in the second mode. The first core has a first core length corresponding to the first machine output rating, and the second core has a second core length corresponding to the second machine output rating.

In yet another embodiment, the invention provides an electrical machine having a shaft rotatable about an electrical machine axis, a rotor mounted or coupled to the shaft and rotating with the shaft, and a stator including a plurality of stator teeth. Each stator tooth includes one or more channels along a surface adjacent to the rotor. The channel includes one of a trapezoidal shape, and a curvilinear shape.

In another embodiment, the invention provides a method of manufacturing an electrical machine having a stator and a rotor. The method includes the acts of determining a desired output rating from a plurality of output ratings; determining a length of the stator, the length having a relation to the desired output rating; determining a length of the rotor, the length having a relation to the desired output rating; producing the stator; providing a magnetizer configured to magnetize the rotor into a plurality of sections; and producing the rotor. The act of producing the rotor includes magnetizing the rotor to include a first section when the desired output rating corresponds to the first output rating and magnetizing the rotor to include the first section and a second section when the desired output rating corresponds to the second output rating.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "connected," "coupled," and "mounted" and variations thereof herein are used broadly and, unless otherwise stated, encompass both direct and indirect connections, couplings, and mountings. In addition, the terms connected and coupled and variations thereof herein are not restricted to physical and mechanical connections or couplings.

Figure 1:
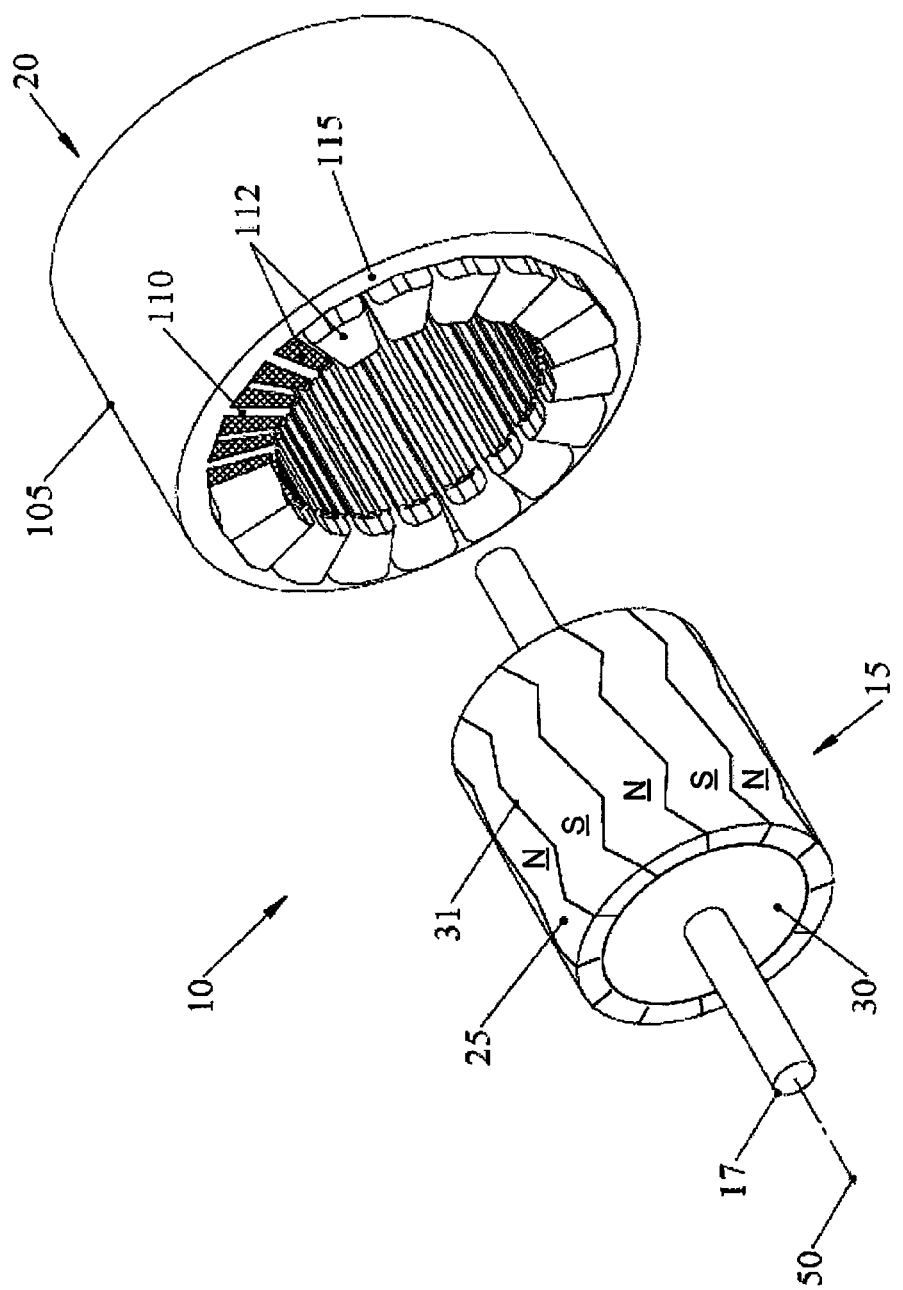
FIG. 1 is partial exploded view of the stator and rotor of a brushless permanent magnet electrical machine.

FIG. 1 is a partial exploded view of the stator and rotor of one construction of an electrical machine (e.g., motor, generator, etc.). For FIG. 1, the electrical machine is a motor 10 having a rotor 15 and a stator 20. The rotor 15 is coupled to a shaft 17. In general, the stator 20 receives electrical power, and produces a magnetic field in response thereto. The magnetic field of the stator 20 interacts with a magnetic field of the rotor 15 to produce mechanical power on the shaft 17. The invention below refers to the electrical motor 10, however the invention is not limited to the motor 10.

The rotor 15 includes a plurality of magnetic poles 25 of alternating polarity exhibited on a surface of a rotor core 30. The rotor core 30 includes laminations (e.g., magnetic steel laminations), and/or solid material (e.g., a solid magnetic steel core), and/or compressed powdered material (e.g., compressed powder of magnetic steel). One construction of the rotor 15 includes a sheet of permanent magnet (e.g., hard magnetic) material disposed on the rotor core 30. Another construction of the rotor 15 can include a plurality of strips of permanent magnet material attached (e.g., with adhesive) around the core 30. The permanent magnet material can be magnetized by a magnetizer to provide a plurality of alternating magnetic poles. Additionally, the number of magnetic strips can be different than the number of rotor magnetic poles. Yet another construction of the rotor 15 contains blocks of permanent magnet material placed inside the rotor core 30.

The description of the invention is not limited to a particular mechanical construction, geometry, or position of the rotor 15. For example, FIG. 1 shows the rotor 15 located inside and separated by a radial air gap from the stator 20. In another construction, the rotor 15 can be positioned radially exterior to the stator 20 (i.e., the machine is an external- or outer-rotor machine.)

One method to reduce cogging and ripple torque is skewing the magnetization of the magnetic poles 25 with respect to the stator 20. Alternatively, stator teeth of the stator 20 can be skewed with respect to the rotor magnetization. The optimal arc of skew in the magnetization of the rotor is dependent on the electrical machine topology and particular machine design. As shown in FIGS. 1-5, the "magnetization" of the rotor 15 refers to the line pattern 31 along the length of the rotor 15 delineating alternating magnetic poles 25 on the rotor core 30. Even though a rotor 15 of the invention can include any number of alternating magnetic poles 25, FIGS. 2-5 show only one line pattern along the rotor 15 for the sake of simplicity.

Figure 13:
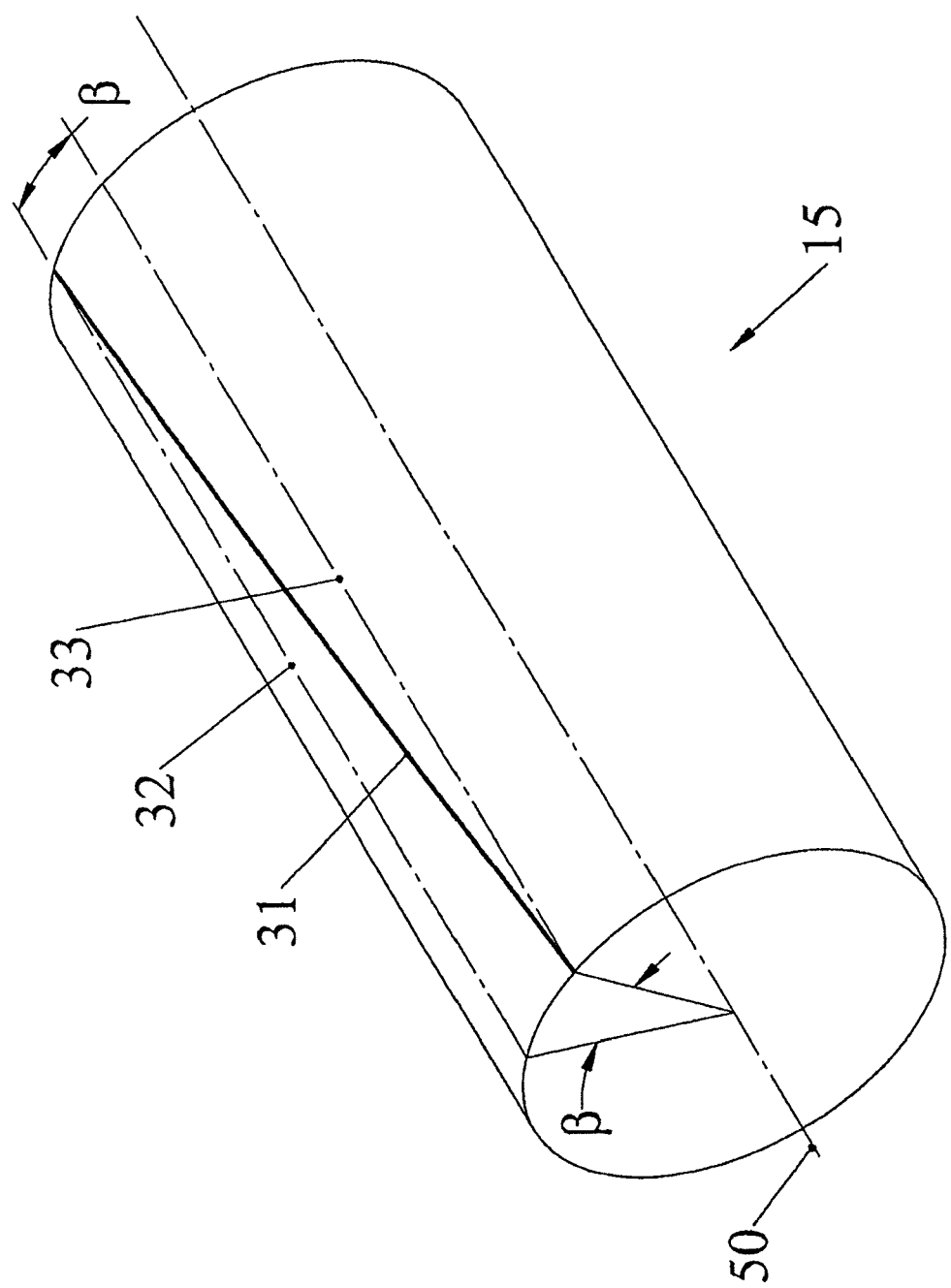
FIG. 13 is an isometric view showing the geometry used to define an arc of magnetization skew ($\beta$) on the rotor.

FIG. 13 illustrates the geometrical concepts involved in defining the magnetization skew of the rotor. The arc of magnetization skew can be defined as the arc ($\beta$), measured in radians in between the longitudinal lines 32 and 33 (see FIG. 2) on the rotor surface facing the air-gap, which separates the stator and the rotor.

Figure 2:
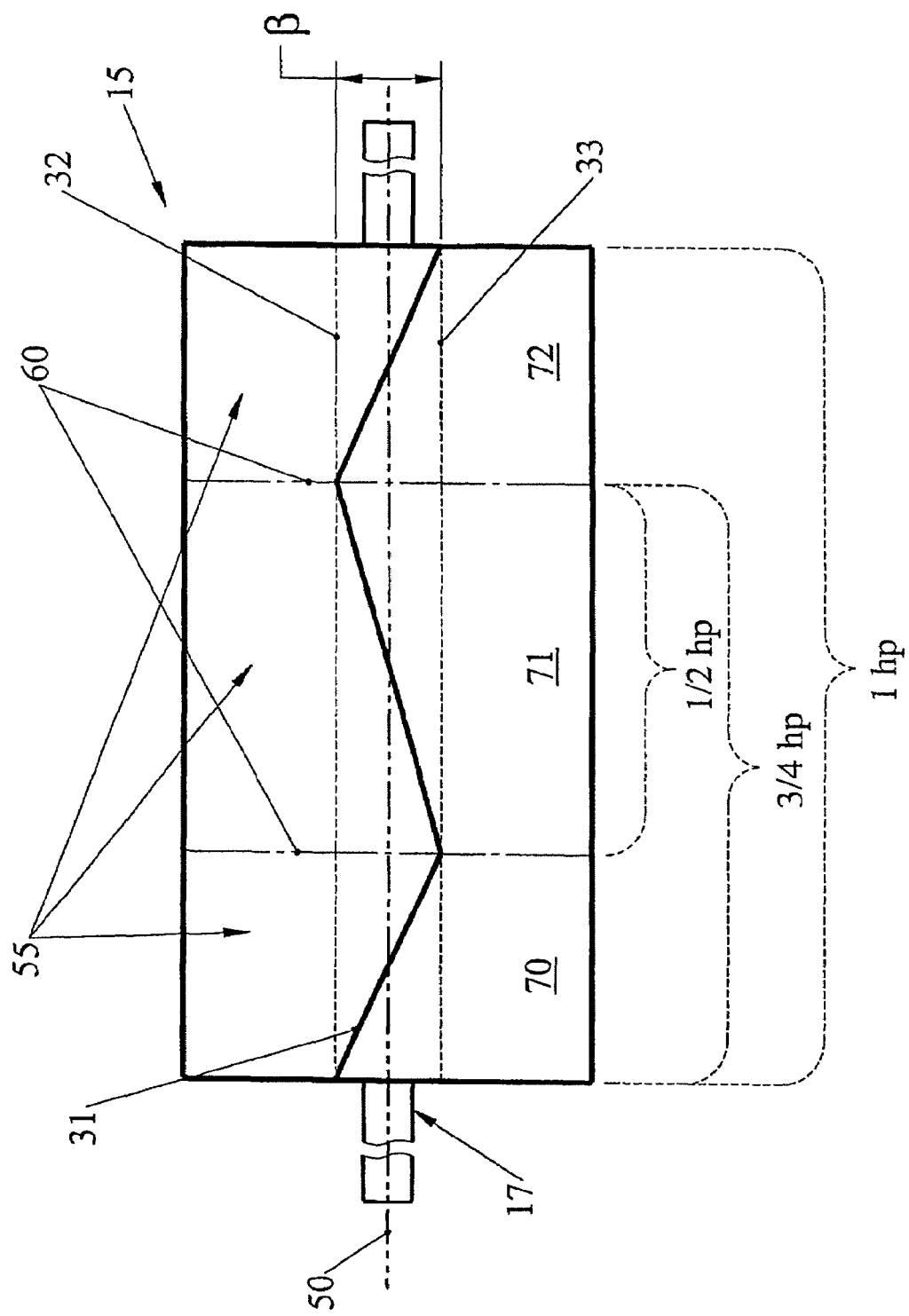
FIG. 2 is a longitudinal view of one construction of the rotor of FIG. 1.

FIG. 2 is a schematic diagram of one construction of the rotor 15 divided into a plurality of axial sections 55 (e.g., 70, 71, and 72) along the rotational axis 50 of the rotor 15. The number of axial sections 55 can vary and is not limiting on the invention. An axial section 55 refers to a portion of the rotor 15 differentiated by imaginary lines 60. Imaginary lines 60 refer to locations on the rotor 15 where the direction of skew of the magnetization pattern 31 changes. One construction of the rotor 15 includes alternating magnetic poles with substantially the same arc of magnetization skew ($\beta$) along each axial section 55, resulting in a herringbone pattern of magnetization. The length of each axial section 55 can vary. The arc of magnetization skew is generally the same for each axial section 55 in order to ensure the continuity of the magnetic poles, and is selected such as to minimize cogging and ripple torque. However, the outer axial sections (denoted by 95 and 100 in FIG. 5) can have a different arc of magnetization skew as it will be explained later.

Figure 6:
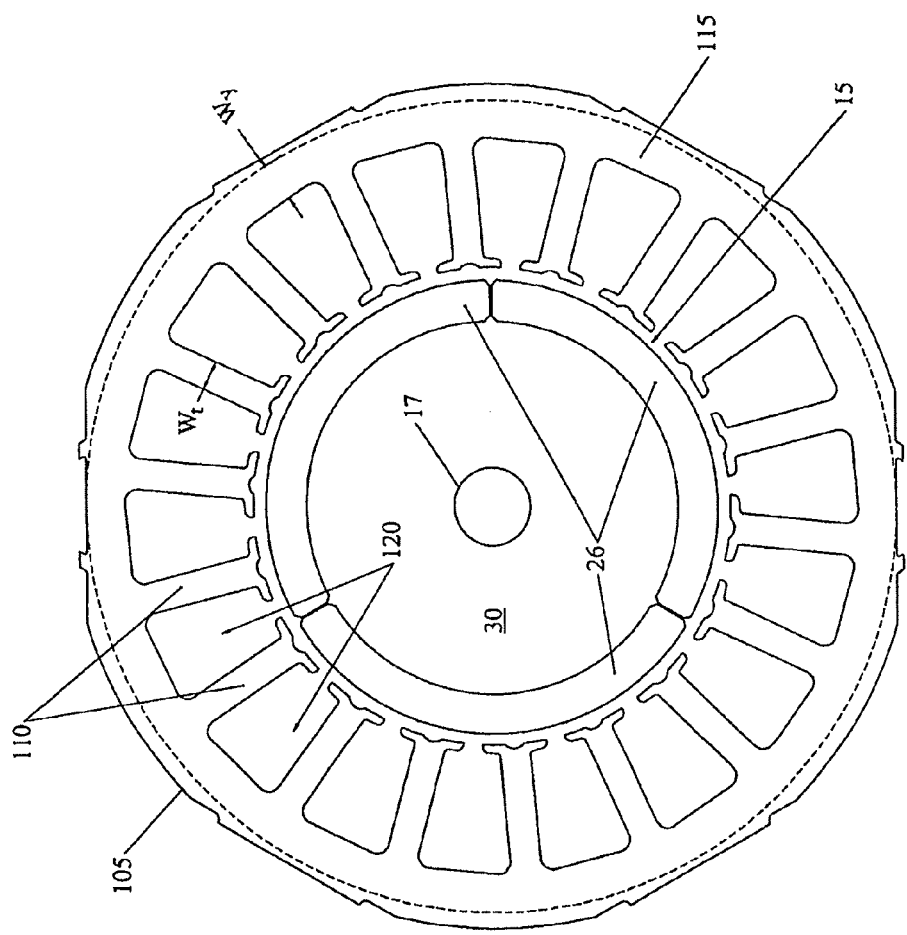
FIG. 6 is a cross-sectional view of a stator core and a rotor capable of being used in the electrical machine of FIG. 1.

The design (e.g., the length and magnetization pattern) of the rotor relates to the desired output rating (e.g., power rating in horsepower or torque and speed rating) of the electrical machine, where the desired power output rating is one of multiple ratings for the profile of the stator and rotor. Herein, the cross-sectional profile of the stator and rotor refers to the cross-sectional geometry of the stator core 105 and rotor 15. For example, FIG. 6 shows the profile of one construction of the stator core 105 and rotor 15 of the invention. The electrical machine 10, in one construction, provides a plurality of output ratings using the same profile of the stator core 105 by varying the length (e.g., the number of laminations in the stack) of the stator core in magnetic interaction with a respective combination of axial sections 55 of the rotor 15. This aspect of the invention reduces tooling costs and inventory. In some constructions, when varying by design the stator stack length, the winding pattern is kept the same and the number of turns and wire size are changed in order to match the electrical power supply conditions, the desired output rating, and other design requirements, such as the copper fill factor.

One method of providing the herringbone magnetization pattern (see FIG. 1) on the rotor 15 includes the use of a magnetizer and a magnetizing fixture. Normally, a particular magnetizing fixture is required for an electrical machine having a particular length of rotor 15. The rotor 15 of the invention allows the same magnetizer and magnetizing fixture to be used for multiple output power ratings, thereby reducing tooling costs.

FIG. 2 shows one construction of the rotor 15 including three axial sections 70, 71, and 72. The stator 20 interacts with one or more of the three axial sections 70, 71, and 72 to provide multiple output ratings for the profile of the motor. The first axial section 70 includes magnetic poles aligned with a first skew direction, the second axial section 71 includes magnetic poles aligned with a second skew direction, and the third axial section 72 includes magnetic poles aligned with the first skew direction. The second axial section 71 interacts with a first stator 20 to provide a minimum rating for the profile of the motor (e.g., a one-half horsepower output). A combination of the first 70 and second 71 axial sections interact with a second stator 20 to provide an intermediate rating for the profile of the motor (e.g., a three-quarter horsepower output). A combination of all three axial sections 70, 71, and 72 interact with a third stator 20 to provide a maximum rating for the profile of the motor (e.g., a one horsepower output). This construction of the rotor 15 includes fewer changes in skew direction along the rotor with respect to the description of the other constructions given below, such that the magnetizing fixture includes a more simple and accurate magnetization pattern. Making the first 70 and third 72 axial sections of the same length and arc of magnetization skew ($\beta$), contributes to the axial magnetic symmetry of the motor having the maximum rating for the profile of the motor. However, with a construction of the rotor 15 as shown in FIG. 2, characterized as including a number of axial sections equal to the number of possible output ratings within the profile of the motor 10, the axial symmetry of a motor of an intermediate output rating is not necessarily guaranteed.

Figure 3:
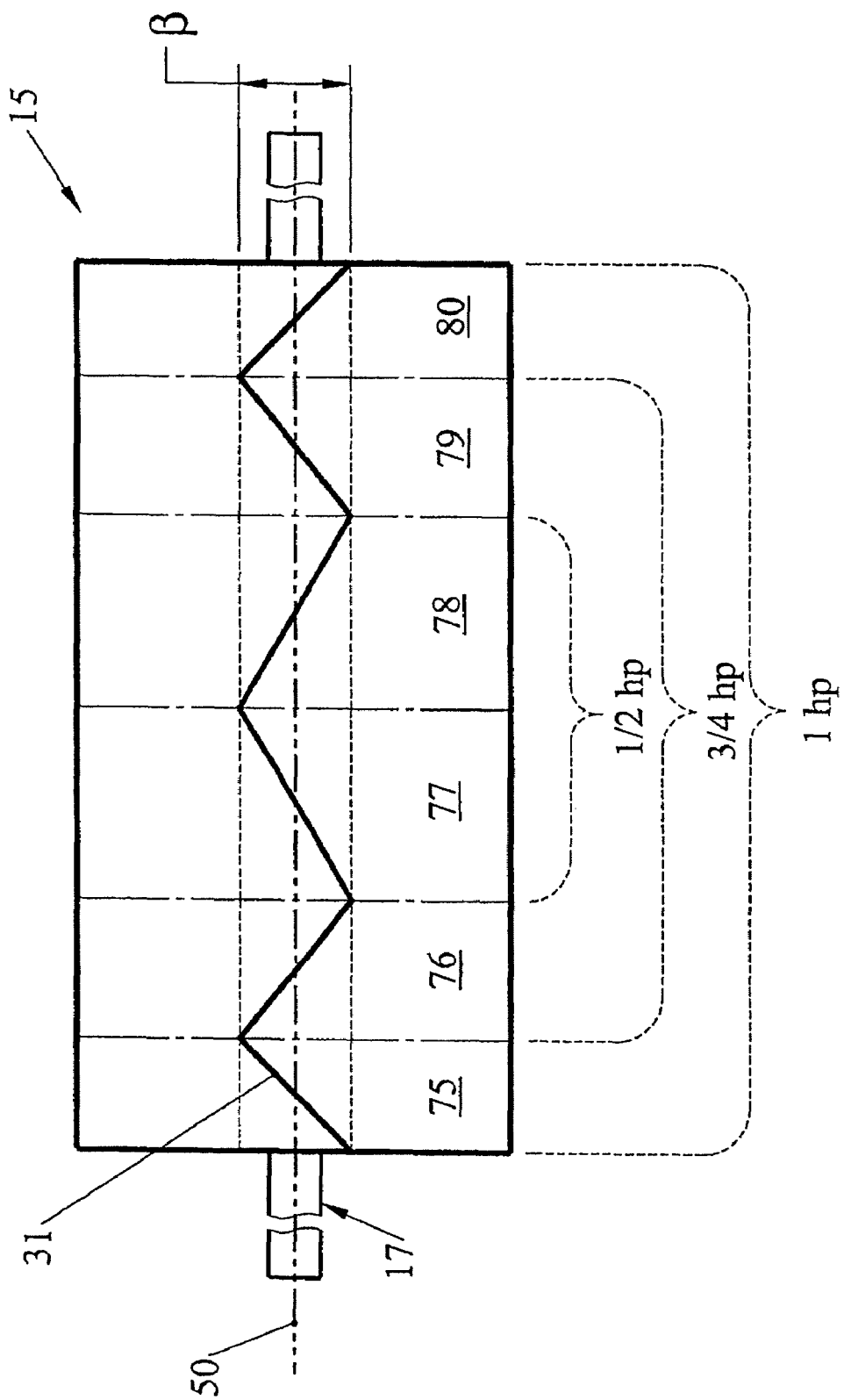
FIG. 3 is a longitudinal view of another construction of the rotor of FIG. 1.

FIG. 3 is a schematic diagram of yet another construction of the rotor 15. The construction shown in FIG. 3 is characterized as including a number of axial sections equal to double the number of possible output ratings within the profile of the motor 10. For example and as shown in FIG. 3, the rotor 15 includes six axial sections 75, 76, 77, 78, 79, and 80 operable to provide three power output ratings. The third 77 and fourth 78 axial sections interact with a first stator 20 to provide a minimum rating for the profile of the motor (e.g., one-half horsepower output). A combination of the second 76, third 77, fourth 78, and fifth 79 axial sections interact with a second stator 20 to provide an intermediate rating for the profile of the motor (e.g., a three-quarter horsepower output). All six axial sections 75, 76, 77, 78, 79, and 80 interact with a third stator 20 to provide a maximum rating for the profile of the motor (e.g., a one horsepower output). The first, second, and third stators 20 described above include the same profile of stator core 105, but can differ in the length (e.g., number of laminations) of the stator core to provide the desired output rating.

Figure 4:
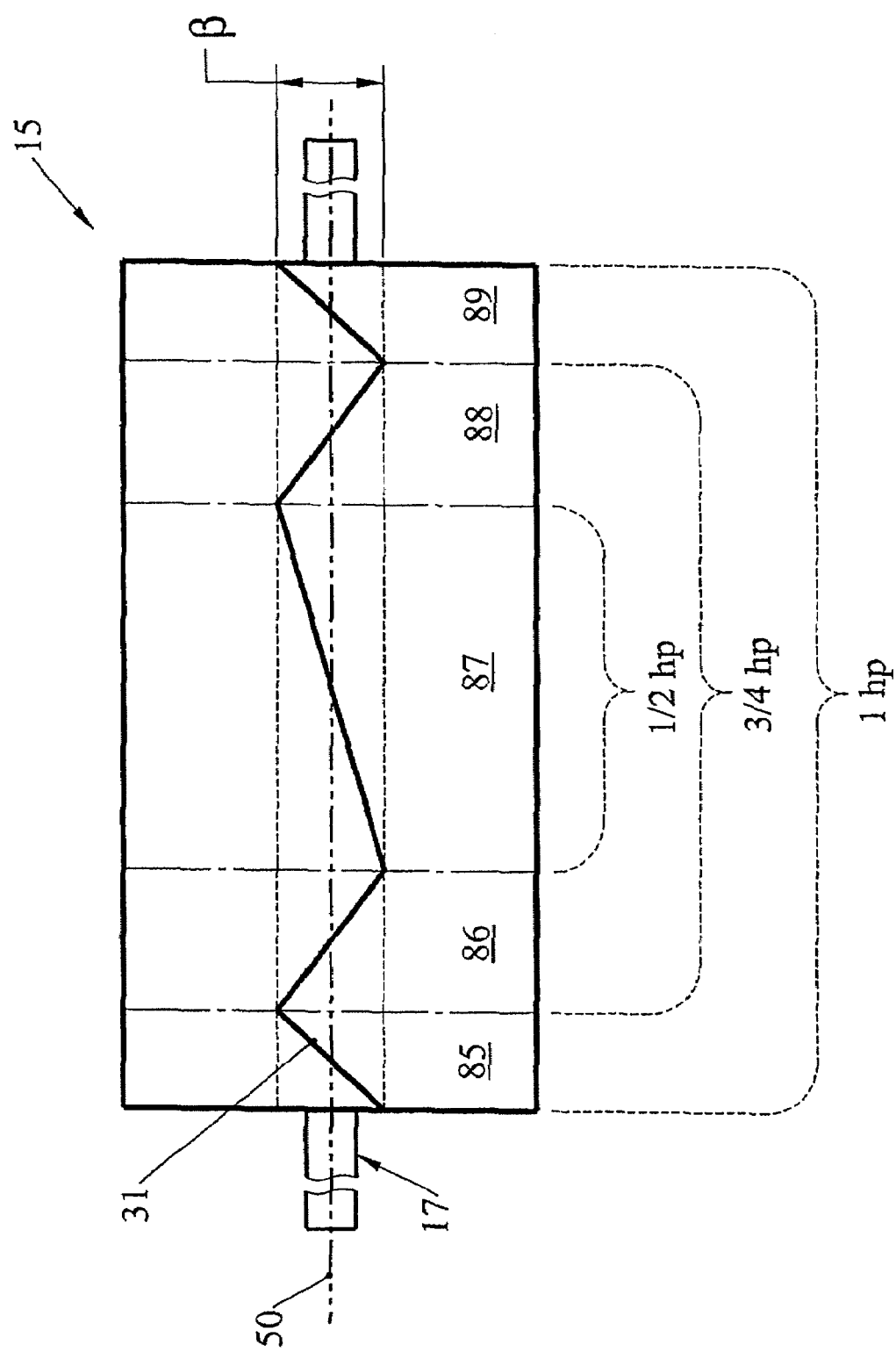
FIG. 4 is a longitudinal view of yet another construction of the rotor of FIG. 1.

FIG. 4 is a schematic diagram of yet another construction of the rotor 15 of the invention. This construction is characterized by the number of axial sections equal to double minus one the number of possible output ratings within the profile of the motor 10. For example, FIG. 4 shows the rotor 15 including five axial sections 85, 86, 87, 88, and 89 operable to provide three power output ratings. The third 87 axial section interacts with a first stator 20 to provide a minimum rating for the profile of the motor (e.g., one-half horsepower output). A combination of the second 86, third 87, and fourth 88 axial sections interact with a second stator 20 to provide an intermediate rating for the profile of the motor (e.g., a three-quarter horsepower power output). A combination of the all five axial sections 85, 86, 87, 88, and 89 interact with a third stator 20 to provide a provide a maximum rating for the profile of the motor (e.g., a one horsepower output). Each of the sections 85, 86, 87, 88, and 89 can be of different length. The first, second, and third stators 20 described above include the same profile of stator core 105, but can differ in the length (e.g., number of laminations) of the stator core to provide the desired output rating.

The constructions of the invention shown in FIG. 3 and FIG. 4 provide more freedom to vary by design the lengths of the axial sections and improve the axial symmetry of the motor. In the rotor construction shown in FIG. 3, the axial symmetry of the motor is improved if the first 75 and sixth 80, the second 76 and the fifth 79, the third 77 and the fourth 78 axial sections, have, respectively, equal length and arc of magnetization skew. In the rotor construction shown in FIG. 4 the axial symmetry of the motor is improved if the first 85 and the fifth 89, the second 86 and the fourth 88 axial sections have, respectively, equal length and arc of magnetization skew. In the rotor construction shown in FIG. 5 the axial symmetry of the motor is improved if the first 95 and the sixth 100, the second 96 and the fifth 99 axial sections, and the third 97 and the fourth 98 axial sections have, respectively, equal length and arc of magnetization skew.

One construction of a rotor 15 design includes a first one or more axial sections in relation to a first output rating ($P_1$) (e.g., one-half horsepower output). The first one or more axial sections 55 have a first length ($L_1$). A ratio of the first length $L_1$ of the first one or more axial sections 55 divided by a maximum length ($L_m$) of the rotor, used for a maximum rating ($P_m$) for the profile of the motor, is in a range of ¾ to ½ times the ratio of the power ratings ($P_1/P_m$), with a preferred range of ¾ to 1¼ times the ratio of the power ratings ($P_1/P_m$). This range of power and length ratio provides the designer with freedom to design for a desired output rating by trading off, on one hand the motor size and cost, and on the other hand motor efficiency. The rotor 15 can also include a second one or more axial sections in relation to an intermediate rating for the profile of the motor ($P_i$) (e.g., a half horsepower output). The second one or more axial sections have a second length ($L_i$), and the second length includes the first length. A ratio of the second length of the second one or more axial sections divided by a maximum length of the rotor ($L_m$) is in a range of ¾ to 1½ of the ratio of the power ratings ($P_i/P_m$), with a range of ¾ to 1¼ times the ratio of the power ratings ($P_i/P_m$).

The total number of axial sections and the total number of ratings for a given motor profile are not limiting on the invention. Therefore, generally speaking, a rotor 15 design includes one or more axial sections in relation to a first output rating ($P_x$) (e.g., one-half horsepower output, ¾ horsepower output, etc.). The one or more axial sections 55 have a first total length ($L_x$). A ratio of the first total length $L_x$ of the one or more axial sections 55 divided by a maximum length ($L_m$) of the rotor, used for a maximum rating ($P_m$) for the cross-sectional profile, is in a range of ¾ to 1½ times the ratio of the power ratings ($P_x/P_m$), with a preferred range of ¾ to 1¼ times the ratio of the power ratings ($P_x/P_m$).

In addition to reducing cogging and ripple torque, the arc of magnetization skew also affects the specific torque output (e.g., torque per unit axial length at a given current) of the motor 10. In general, the torque output or power rating decreases as the arc of magnetization skew increases. Reducing the arc of magnetization skew can increase the motor torque output per axial length. Accordingly, at the penalty of increasing the cogging and ripple torque, reducing the arc of magnetization skew allows shortening of the axial length of the rotor 15 and maintaining a desired power output of the motor 10. Shortening the axial length of rotor 15 reduces material costs.

Figure 5:
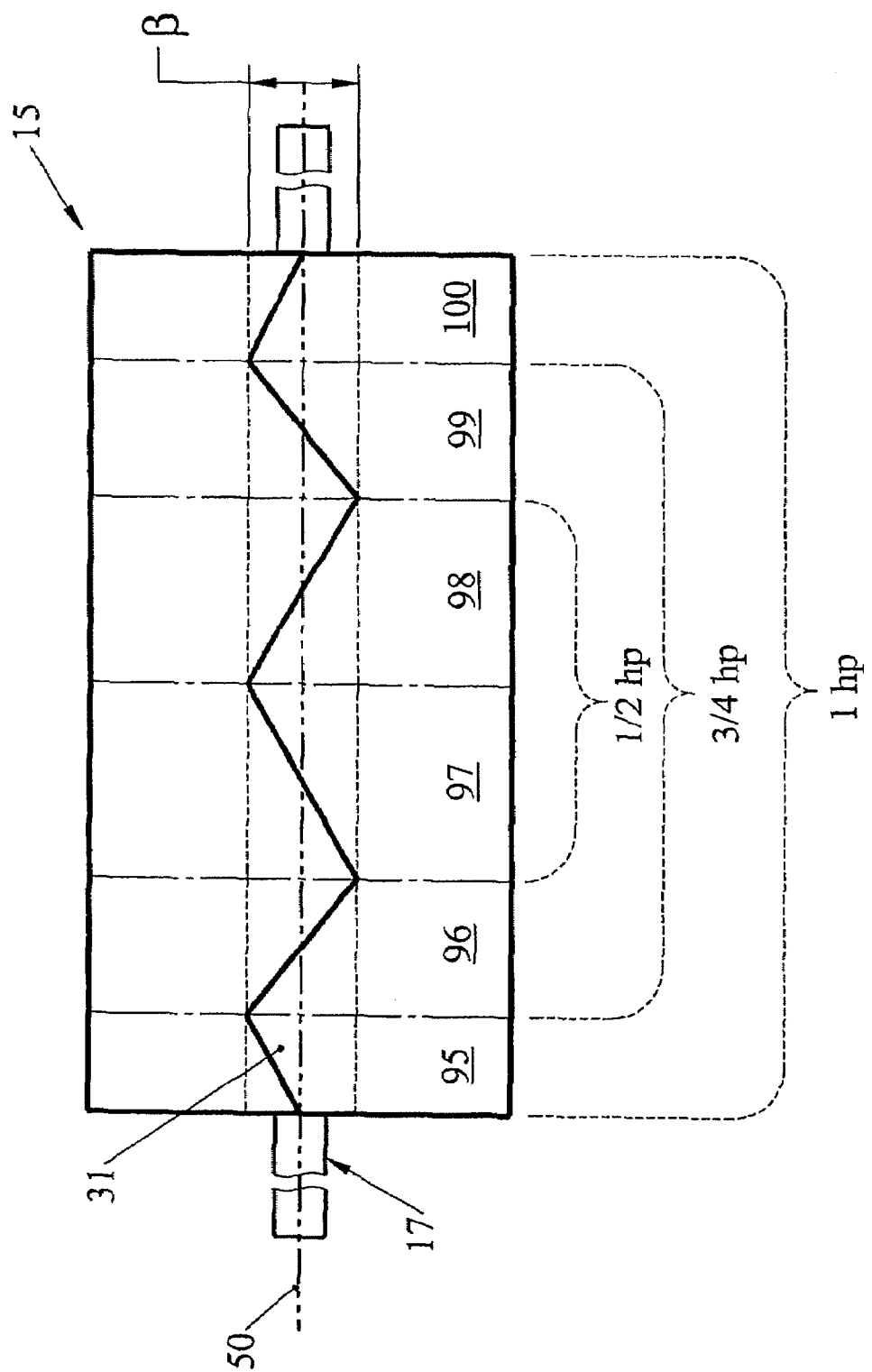
FIG. 5 is a longitudinal view of another construction of the rotor of FIG. 1.

FIG. 5 shows yet another construction of the rotor 15 including inner sections 96, 97, 98, and 99 having substantially equal arc of magnetization skew, and outer sections 95 and 100 having a lesser arc of magnetization skew with respect to the magnetization skew of the inner sections 96, 97, 98, 99. The inner sections 96, 97, 98, 99 include the same arc of magnetization skew to enhance continuity and symmetry. The outer sections 95 and 100 have a lesser arc of magnetization skew ($\beta$) to enhance the output rating of the electrical machine with use of all six axial sections 95, 96, 97, 98, 99, and 100.

For FIGS. 2-5 described above, the value and number of output ratings can vary and is not limiting on the invention. In addition, the incremental difference between output ratings related to one or a combination of axial sections 55 can vary and is not limiting on the invention.

In one construction of the invention, the electrical machine includes the rotor 15 having a plurality of axial sections as shown in one of FIGS. 2-5. The rotor 15 provides multiple output ratings for the profile of the machine. This construction of the electrical machine uses the same rotor 15 in electrical machines of varying output ratings, thereby reducing the part count and the inventory required for producing a range of motors of different output ratings using the same motor profile.

In another construction of the electrical machine, one or more axial sections 55 of the rotor 15 are not present when the desired output rating of the electrical machine is less than the maximum power output rating for the machine to be produced using the same stator core profile. For example, for the electrical machine having a desired output rating of one-half horsepower, the rotor axial sections 70 and 72 of FIG. 2 are not necessary. This construction of the electrical machine allows the use of the same magnetizer to magnetize the rotor 15 having a range of output ratings within the profile of the machine. In addition, this construction reduces the material waste (e.g., 70 and 72 of FIG. 2) of the rotor 15.

Various designs of stator 20 can be used to interact with each construction of the rotor 15 described above and shown in FIGS. 2-5. The following is a description of one construction of the invention that includes the rotor 15 disposed radially from the stator 20. With reference to FIG. 1, the stator 20 includes a stator core 105 having a plurality of stator teeth 110 and stator windings 112. In one construction, the stator core 105 includes a stack of magnetic steel laminations or sheets. In other constructions, the stator core 105 is formed from a solid block of magnetic material, such as compacted powder of magnetic steel. The stator windings 112 include electrical conductors placed in the slots 120 (FIG. 6) and around the plurality of teeth 110. Other constructions and types of the stator core 105 and stator windings 112 known to those skilled in the art can be used and are not limiting on the invention.

Electrical current flowing through the stator windings 112 produces a magnetic field that interacts with the magnetization of the rotor 15 to provide torque to the rotor 15 and shaft 17. The electrical current can be an (m) phase alternating current (AC), where (m) is an integer greater than or equal to two. The electrical current can have various types of waveforms (e.g., square wave, quasi-sine wave, etc). The stator windings 112 receive electrical current from an electrical drive circuit (not shown). One construction of the electrical drive circuit includes a controller and an inverter with one or more power electronic switches (e.g., MOSFET, IGBT) to vary the flow of electrical current to the windings dependent on various electrical machine operating parameters (e.g., speed, load, rotor position, etc.). To determine the position of the rotor 15, the control circuit includes, in some constructions, a sensor (e.g., Hall effect device, encoder, etc.) to provide the control circuit with a signal representative of the rotor position. Alternatively, the control circuit can estimate the rotor position through what is commonly referred as a sensorless control. The electrical drive circuit can include other components and circuit constructions known to those skilled in the art and is not limiting on the invention.

FIG. 6 shows a cross-sectional profile of a motor cross-section perpendicular to axis 50 used in one motor construction (the stator windings 112 are not shown in FIG. 6). The stator core 105 includes the plurality of stator teeth 110, slots 120, and a back iron portion 115. Each of the plurality of stator slots 120 receives one or more stator coils, the assembly of which constitutes the stator windings 112. The stator windings receive a multi-phase electrical current, where the number of phases (m) is an integer greater than or equal to two. The number (t) of stator teeth 110 equals the number of slots 120, where (t) is an integer. A slot 120 is defined by the space between adjacent stator teeth 110. The rotor 15 is produced, in one construction, by fixing three arc shaped magnets 26 on a rotor core 30. Other rotor designs and constructions are also possible as mentioned previously. A magnetizer is used to produce on the rotor 15 a number (p) of alternating magnetic poles that interact with the stator 20, where (p) is an even (i.e., divisible by 2) integer greater than or equal to two. The stator core 105 includes a ratio of the number of stator teeth to magnetic poles (t/p) equal to (m/2) or (m/4).

The stator core 105 having the above-described construction (see FIG. 6) can be used to design and manufacture motors with various (m) electric phases, with windings 112 composed of compact coils (see the winding patterns in FIG. 11 and FIG. 12) and rotors having poles (p). For example, a stator core 105 having a same cross sectional profile with a number (t) of stator teeth 110 can be used, in principle, to produce motors with (m) phases or an increased number of phases (km). In order to maintain the same (t/p) ratio, the number of poles can be reduced to (p/k), and therefore (k) can be any integer for which (p/k) is an even integer greater than or equal to two. Alternatively, the number of phases can be decreased from (m) to an integer (m/k), where (k) is any integer for which (m/k) is an integer greater than or equal to two. In order to maintain the same (t/p) ratio, the number of magnetic poles can be increased to (kp).

To provide a stator 20 with (m) symmetrical electric phases, within each phase the compact coils, belonging to the phase, are connected such that consecutive phases are placed at a mechanical angle of ($4\pi/(mp)$) radians. For any number of phases (m), the number (t) of teeth and number (p) of poles is designed so that their ratio (t/p) is equal to (m/2) or (m/4). The number of teeth per pole and phase (t/p/m) is therefore a design constant, equal to ½ or ¼ respectively, and therefore for constant air-gap magnetic loading (i.e. flux density), the magnetic flux per tooth remains constant. Therefore, the stator teeth 110 can be optimally designed for any number of phases.

In some constructions of the machine, it is generally desired for the back iron portion 115 (see FIG. 6) to operate at approximately the same magnetic loading as the teeth 110.

To equalize the magnetic loading, a minimum width of the back iron portion 115 can equal half the value of the product of the number of teeth per pole times the tooth width. The minimum width ($w_y$) of the back iron is defined as the minimum distance between the top of a slot 120 and a circle with the center on the rotational axis 50 and a radius equal to the minimum distance between the rotational axis 50 and any of the flat surfaces from the outside surface of the stator core 105 (see FIG. 6). The number of teeth per pole (t/p) can be an integer or a fractional number. Limits on the minimum width of the back iron portion 115 include manufacturability and increased mmf drop and core losses related to back-iron flux density. For a design with an increased number of phases (m), the number of poles (p) is decreased by design in order to maintain a constant ratio (t/p) for a given lamination. Lowering by design the number of poles (p) results in an increased magnetic pole pitch and, for the same air-gap magnetic loading, an increased magnetic flux density in the back iron portion 115. Lowering by design the number of poles (p), also results in a decrease of the fundamental frequency of the magnetic field for a given rotational speed of electrical machine and limits core losses in the back-iron portion 115. Finite element analysis that considers the above-described parameters indicates the width of the back iron portion 115 ranges between (1½-4½) times the product of the number of teeth per pole (t/p) divided by 2 and times the tooth width ($w_t$).

Figure 11:
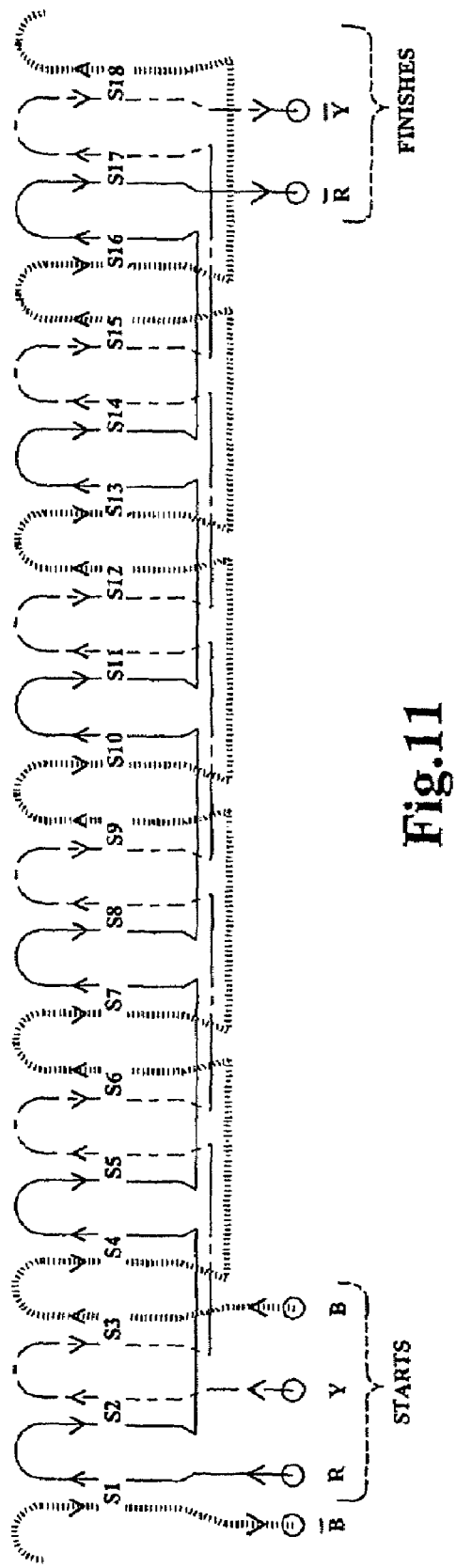
FIG. 11 is an example of a stator-winding pattern in a double-layer arrangement with compact coils for an 18-slot, 12-pole, 3-phase machine.

One construction of the stator windings 112 includes a double layer arrangement of compact coils (FIG. 11), which are placed around each tooth (i.e. the coils have a pitch of 1-slot). In this double layer arrangement, each slot is shared by two coil sides, each of the coil sides belonging to a different coil and phase. The two coil sides sharing a slot can be placed side by side or one on top of the other. The double-layer winding pattern for an example 18-slot, 12-pole, 3-phase winding is shown in FIG. 11. Following the rules set above, for a given stator core and a winding with compact coils and a double layer pattern, the coil connections, the number of turns per coil and the wire size can be modified by design in order for the machine to operate with any number of phases (m) and poles (p) for which (t/p) is equal to (m/2) or (m/4).

Figure 12:
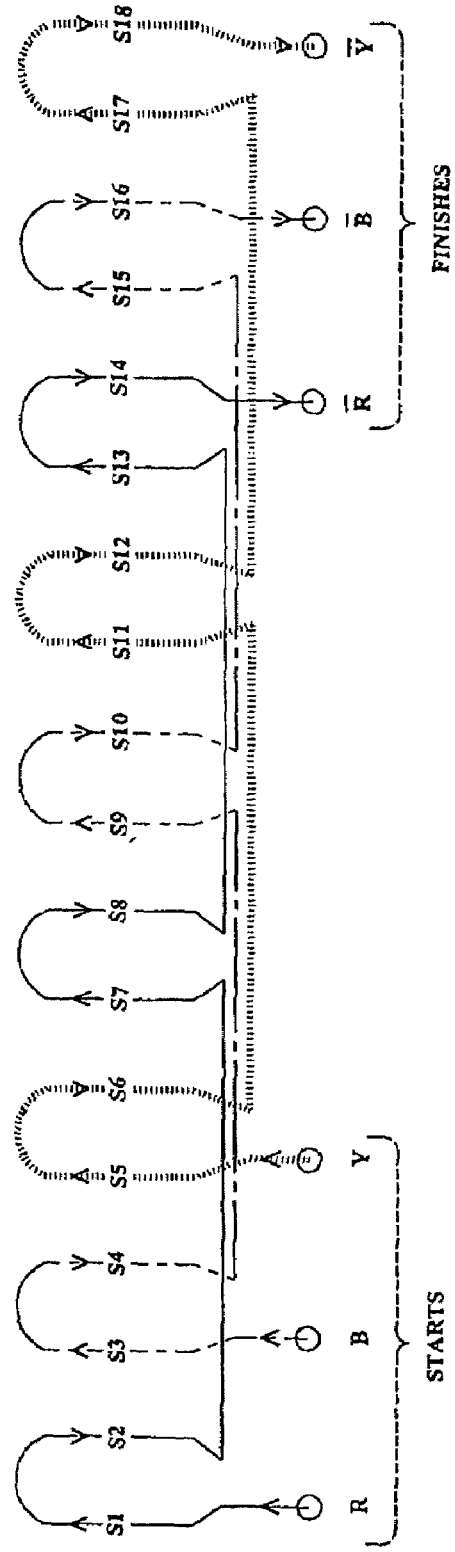
FIG. 12 is an example of a stator-winding pattern in a single-layer arrangement with compact coils for an 18-slot, 12-pole, 3-phase machine.

Another construction of the windings 112 includes a single layer arrangement of compact coils (FIG. 12), which are placed around every other tooth (i.e. the coils have a pitch of 1-slot and are only placed around half the number of teeth). In this single layer arrangement, each slot contains only one coil side. The single layer winding pattern for an example 18-slot, 12-pole, 3-phase winding is shown in FIG. 12. Following the rules set above, for a given stator core and a winding with compact coils and a single layer pattern, the coil connections, the number of turns per coil and the wire size can be modified by design in order for the machine to operate with any number of phases (m) and poles (p) for which (t/p) is equal to (m/2) or (m/4). In comparison with a double layer winding with compact coils, a single layer winding with compact coils has only half the number of coils but the per phase end-winding is generally longer.

The phase windings of the stator 20 are symmetrically and equidistantly distributed at an angle of ($2\pi/m$) electrical radians or ($4\pi/(mp)$) mechanical radians. A symmetrical (m) phase system of currents flowing through the stator windings produces a magnetomotive force (mmf) with a space electrical fundamental harmonic of the mechanical order (p/2). The mmf also includes space harmonics of the electrical order (2km−1) and (2km+1), where k is an integer larger or equal to one. When the electrical machine couples to a load, the mmf harmonics cause ripple torque, an undesired machine characteristic described above. The amplitude of the mmf harmonic increases as its harmonic order decreases. The amplitude of the lower-order mmf harmonics (2m−1) and (2m+1) can be significant and their reduction ensures a smooth motor operation.

With simple compact windings, built according to the previous description, conventional means of reducing the mmf harmonics, such as short-pitching the winding are not available. Instead, an optimal magnetization skew is determined and implemented to reduce the mmf harmonics and the ripple torque, as well as the cogging torque.

The skew factor for a v-th electrical order mmf space harmonic is given by the equation: ($k_{sv}=4 \sin(v p \beta/4)/(v p \beta)$), where the arc of magnetization skew ($\beta$) is measured in radians on the rotor surface facing the air-gap (see FIG. 2). A harmonic is completely eliminated if the argument of the sine function satisfies the equation ($v p \beta/4 = n\pi$), where (n) is an integer larger or equal to zero. For an mmf harmonic of the electrical order (v=2km−1) the previous equation is equivalent to ($\beta=4n\pi/(p(2km-1))$) and for an mmf harmonic of the electrical order (v=2km+1) the previous equation is equivalent to ($\beta=4n\pi/(p(2km+1))$). For increasing values of (n) and/or (k), both arrays ($4n\pi/(p(2km-1))$) and ($4n\pi/(p(2km+1))$) converge to ($2\pi/(pm)$).

Therefore, to reduce both (2km−1) and (2km+1) orders of mmf space harmonics, one construction of the motor 10 includes the stator 20 having a ratio of stator teeth 110 per magnetic pole (t/p) equal to (m/2) and the rotor 15 including an arc of magnetization skew ($\beta=2\pi/(pm)$) measured in radians on the rotor surface facing the air-gap. Another construction of the motor 10 includes the stator 20 having a ratio of stator teeth 110 per pole (t/p) equal to (m/4) and the rotor 15 including an arc of magnetization skew ($\beta=2\pi/(pm)$) measured in radians on the rotor surface facing the air-gap.

A typical manufacturing technique to provide a double layer stator winding with compact coils includes use of a needle or gun winder. A substantially large opening of the stator slot 120 is beneficial towards the air-gap in order to allow the needle of the winder to be inserted into the slot.

A typical manufacturing technique to provide a single layer stator winding with compact coils includes use of an insertion winder. A substantially large opening of the stator slot 120 is required in order to allow the conductors to be inserted into the slot. Other types and techniques known to those in the art to provide the stator windings 112 of the stator 20 can be used.

A relatively large opening of slot 120 increases the ease of insertion of the needle winder and of the conductors of the windings, respectively. An opening of the slot 120 suitably large to be cost-effective for automatic winding manufacturing includes a range greater than ⅙th of a tooth pitch. Tooth pitch is the distance between adjacent centerlines 135 (see FIGS. 7-9) of teeth 110. The slots 120 create a variation of the permeance of the air-gap between the rotor 15 and the stator 20. The variation in air-gap permeance interacts with the magnetic field of the rotor 15 to cause cogging torque. As noted above, cogging torque is an undesired characteristic of electrical machines and its minimization, by reducing the variation of the air-gap permeance, while still maintaining a slot opening suitably large for volume manufacturing technologies.

Figure 7:
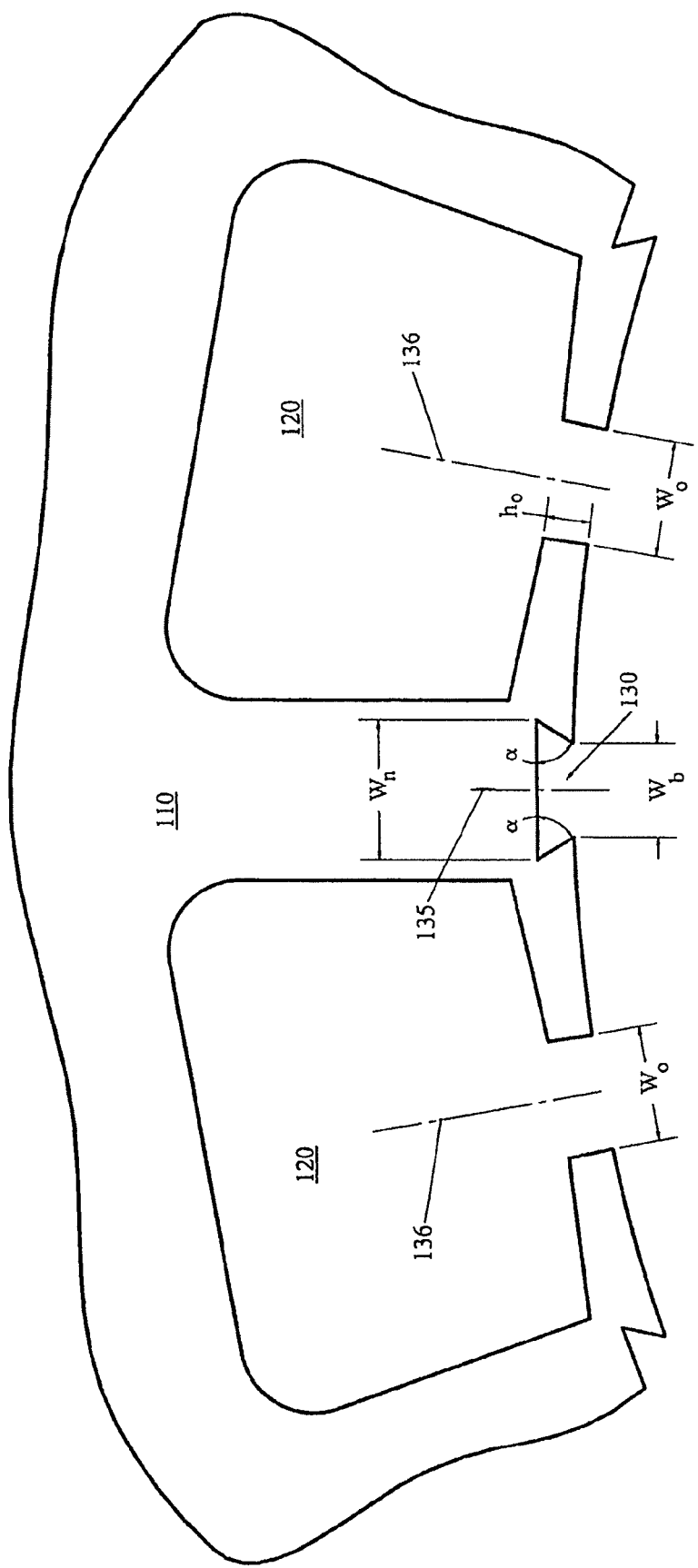
FIG. 7 is a partial cross-sectional view of a portion of a stator core capable of being used in the electrical machine of FIG. 1.
Figure 8:
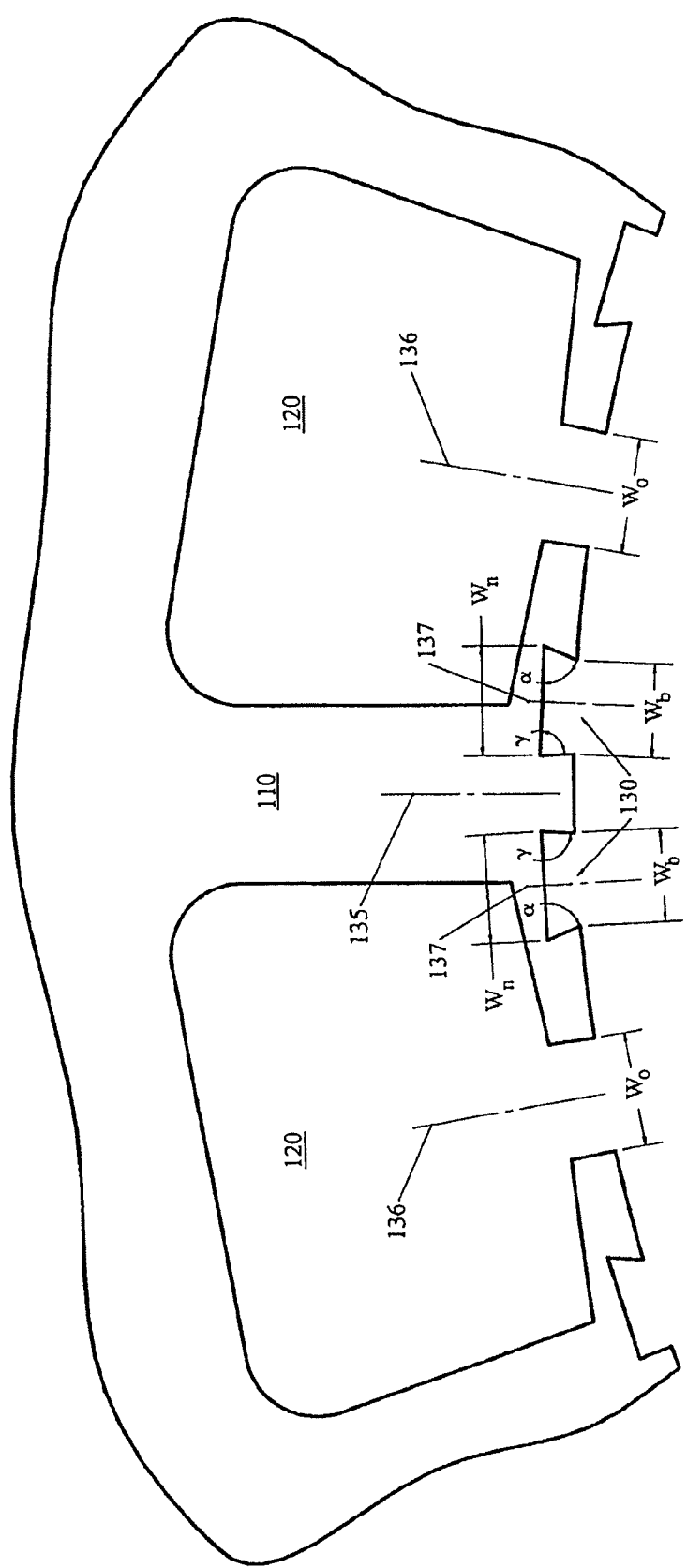
FIG. 8 is a partial cross-sectional view of a portion of a stator core capable of being used in the electrical machine of FIG. 1.
Figure 9:
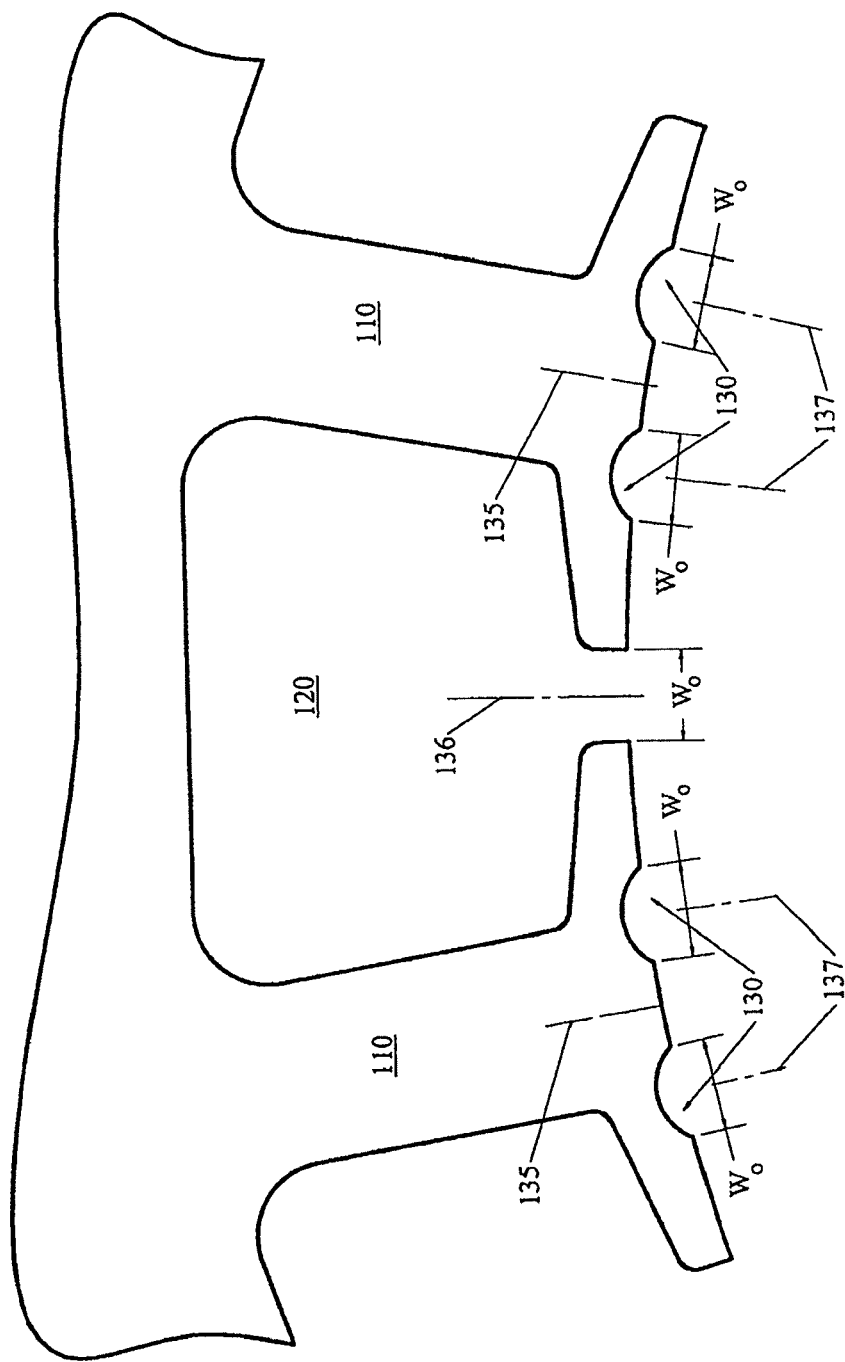
FIG. 9 is a partial cross-sectional view of a portion of a stator core capable of being used in the electrical machine of FIG. 1.

FIGS. 7, 8, and 9 show a construction of the stator core 105 that includes "dummy" channels 130 in the stator teeth 110. The dummy channels 130 reduce the amplitude and, for certain motor designs, can increase the frequency of the cogging torque, as it will be shown in the following. The shape and dimensions of each dummy channel 130 are varied by design to provide a more symmetrical variation of the cogging torque versus rotor position. Constructions of the stator 20 include a suitable core 105 having one or two dummy channels 130 per tooth 110. Of course, the stator 20 of the invention can include more dummy channels 130 and is not limiting on the invention.

The number of equivalent openings of slots 120 of the stator 20 includes the number of slots 120 and the number of dummy channels 130 (see FIGS. 7-9). By adding a number (d) of dummy channels 130 at the free ends of each tooth 110, where (d) is an integer greater than or equal to zero, the number of equivalent slot openings towards the air-gap increases from the number (t) to ([d+1]t). The frequency of the cogging torque is equal to the least common multiple of the number ([d+1]t) of equivalent slot openings and the number of poles (p).

For (t/p=m/2), mathematical induction proves the following:

| Phases (m) | Poles (p) | dummy channels (d) | Cogging frequency (Hz) |
|---|---|---|---|
| 2k | 2j | 1 | mp |
| 2k + 1 | 2j | 0 or 1 | mp |
| 2k + 1 | 2j | 2 | 3 mp | where (k) and (j) are integers greater than or equal to one. In each of the above cases, the arc of magnetization skew ($\beta$) equal to ($2\pi/(mp)$), as measured in radians in between the longitudinal lines 32 and 33 on the rotor surface facing the air-gap (see FIG. 13), causes a reduction of both the cogging torque and torque ripple.

For (t/p=m/4), mathematical induction proves the following:

| Phases (m) | Poles (p) | Dummy channels (d) | Cogging frequency (Hz) |
|---|---|---|---|
| 2k + 1 | 4j | 0 or 1 | mp |
| 2k + 1 | 4j | 2 | 3 mp | where (k) and (j) are integers greater than or equal to one. In each of the above cases, the arc of magnetization skew ($\beta$) is equal to ($2\pi/(mp)$), as measured in radians in between the longitudinal lines 32 and 33 on the rotor surface facing the air-gap (see FIG. 13), causes a reduction of both the cogging torque and torque ripple.

FIG. 7 shows one construction of a stator tooth 110 including a dummy channel 130 having a centerline located at the middle of the tooth 110 and coinciding with the tooth centerline 135. In the construction from FIG. 7, the dummy channel 130 is generally trapezoidal-shaped and is characterized by a top width of channel ($w_n$) a bottom width of channel ($w_b$), and the side angle ($\alpha$). The width of the slot opening ($w_o$) is designed to a minimum value for which cost-effective manufacturing of the stator winding is achieved and the cogging torque is low. The height of the slot opening ($h_o$), and the dimensions of the dummy channels ($w_n$), ($w_b$) and ($\alpha$) are designed to optimize the machine from a magnetic and mechanical point of view.

Finite element analysis of the electromagnetic field indicates a construction of the channel 130 of FIG. 7, including a top width ($w_n$) ranging from $(0.5w_o) \leq (w_n) \leq (1.5w_o)$, a bottom width ($w_b$) ranging from $(0.3w_o) \leq (w_b) \leq (1.2w_o)$ and the side angle ($\alpha$) ranging from $(30°) \leq (\alpha) \leq (135°)$, controls the local level of magnetic saturation in the tooth tip, modifies the air-gap magnetic permeance, reduces the cogging torque, and improves the symmetry of the cogging torque variation against rotor position. Therefore, the cogging torque is substantially reduced in a motor which has, in addition, the rotor magnetization skewed with the optimal arc of skew ($\beta$) previously determined.

FIG. 8 shows a second construction of a stator tooth 110 including two dummy channels 130. The dummy channels are located so that their centerlines 137 are dividing the slot pitch, which is contained in between the centerlines 136 of two adjacent slots, in three intervals of approximately equal length. In the construction from FIG. 8, the dummy channel 130 is generally trapezoidal-shaped and is characterized by a top width of channel ($w_n$), a bottom width of channel ($w_b$), a side angle ($\alpha$), and yet another side angle ($\gamma$). The width of the slot opening ($w_o$) is designed to a minimum value for which cost-effective manufacturing of the stator winding is achieved and the cogging torque is low. The height of the slot opening ($h_o$), and the dimensions of the dummy channels ($w_n$), ($w_b$), ($\alpha$), and ($\gamma$) are designed to optimize the machine from a magnetic and mechanical point of view.

Finite element analysis of the electromagnetic field indicates a construction of the channel 130 of FIG. 8, including a top width ($w_n$) ranging from $(0.5w_o) \leq (w_n) \leq (1.5w_o)$, a bottom width ($w_b$) ranging from $(0.3w_o) \leq (w_b) \leq (w_o)$ and the side angles ($\alpha$) and ($\gamma$) ranging from $(30°) \leq (\alpha) \leq (90°)$ and $(30°) \leq (\gamma) \leq (90°)$, controls the local level of magnetic saturation in the tooth tip, modifies the air-gap magnetic permeance, reduces the cogging torque, and improves the symmetry of the cogging torque variation against rotor position. Therefore, the cogging torque is substantially reduced in a motor which has, in addition, the rotor magnetization skewed in the optimal arc of skew ($\beta$) previously determined. For a construction of a stator 30 including two dummy channels 130 per teeth 110, space limitations can limit the value of the side angles ($\alpha$) and ($\gamma$) to be equal or below ninety degrees.

FIG. 9 shows another construction of a stator tooth having two curvilinear shaped dummy channels 130. The dummy channels are located so that their centerlines 137 are dividing the slot pitch, which is contained in between the centerlines 136 of two adjacent slots, in three intervals of approximately equal length. The opening of the dummy channels 130 towards the air-gap is equal to the opening ($w_o$) of the slot 120. The curvilinear shape follows that of an arc of the circle with the center on the respective dummy channel centerline and a diameter larger or equal to ¾ of ($w_o$) and smaller or equal to 1½ of ($w_o$). This shape and dimensions of the dummy channels reduce the cogging torque and increase the durability of the punching die used for manufacturing stator laminations.

Having described constructions of the electrical machine, a method of assembling one construction of the electrical machine will now be described. It is envisioned that the method may be modified for other constructions. Furthermore, it is envisioned that not all of the acts below may be required, that some of the acts may be modified, or that the order of the acts may vary.

A designer provides the rotor 15 having the plurality of alternating magnetic poles. The rotor 15 is divided into a plurality of portions along the longitudinal axis 50. The plurality of portions can include a first portion related to a first output rating (e.g., one-half horsepower), a second portion relating to a second output rating (e.g., three-quarter horsepower), and a third portion relating to a third output rating (e.g., one horsepower).

Each of the portions is divided into one or more axial sections 55 (e.g., axial sections 70, 71, and 72 in FIG. 2). Each axial section 55 includes a respective arc of magnetization skew ($\beta$) of the alternating magnetic poles in relation to the first, second, and third output ratings of the electrical machine. The arc of magnetization skew ($\beta$) is measured on the rotor surface facing the air-gap, as shown in FIG. 2. A magnetizer is used to provide the magnetization of the axial sections of the rotor. This method of constructing the rotor 15 allows a common magnetizer to be used to provide the magnetization of the rotor for a plurality of desired output ratings of the electrical machine, thereby reducing tooling costs. In one construction of the electrical machine, the end axial sections 55 that are not needed to provide the desired output rating are not included with the rotor 15 and therefore also the material cost is reduced. In another construction, all axial sections 55 (e.g., sections in relation and not in relation to the desired output rating) of the rotor 15 can be retained in the assembly of the rotor 15. This second construction is advantageous if, for example, the cost of the rotor material from the end axial sections that are not necessarily required in relation to the desired output rating is smaller than the cost savings achieved by maintaining an inventory with only a reduced number of rotor dimensions.

Figure 10A:
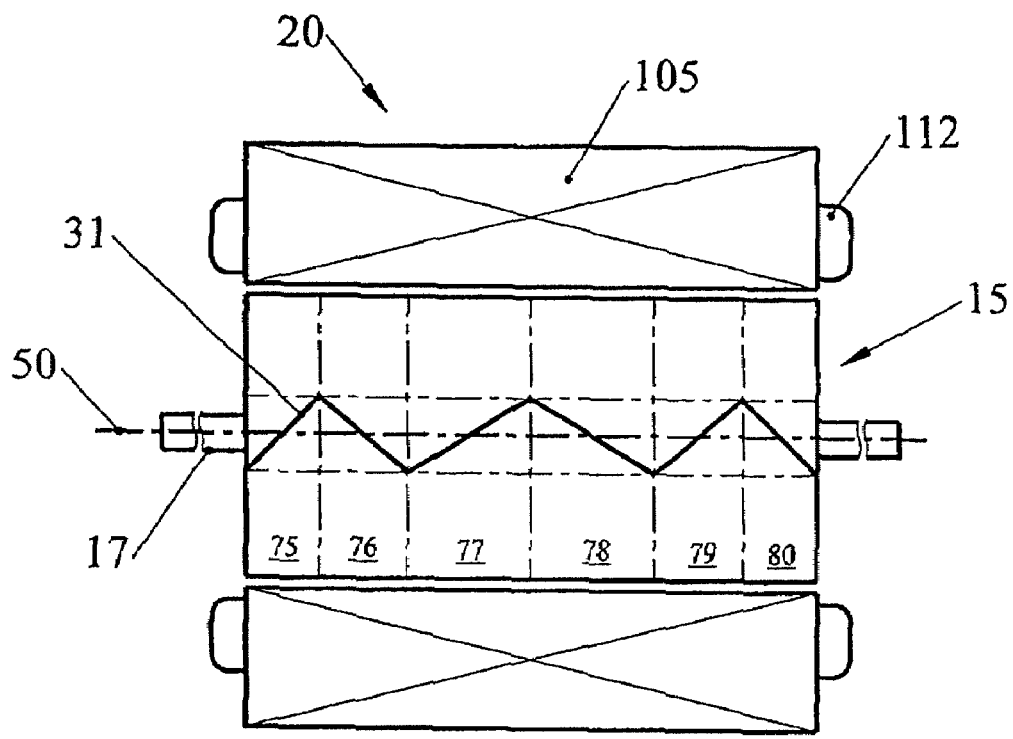
FIG. 10*a* is a combination longitudinal view of a rotor and longitudinal-sectional view of a stator, which has the same core length as the rotor.
Figure 10B:
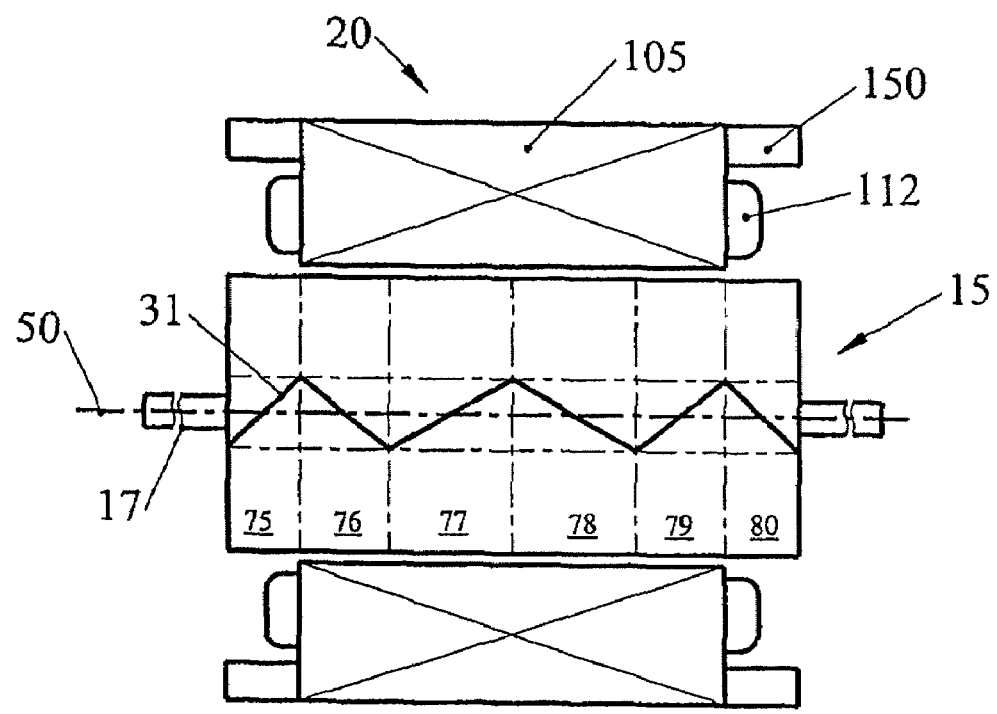
FIG. 10b is a combination longitudinal view of a rotor and longitudinal-sectional sectional view of a stator, which has a shorter core length than the rotor and spacers are used to axially align the stator and the rotor.

Using a uniform profile of the stator 20, the designer determines the length of the stator core 105 to interact with the rotor 15 to provide the desired output rating. For example, with a laminated construction of the stator core 105, the designer selects a stack length of laminations of magnetic material to provide the desired output rating. The stator core 105 is wound with windings 112 designed for the electrical supply conditions, the stator core length, the rotor length, and the desired motor output. The manufacturing operator aligns the stator 20 with the rotor 15, so that the axial centerline of the stator core 105 coincides with the axial centerline of the rotor 15 and no side-pull axial forces are exhibited due to stator-rotor misalignment (see FIG. 10*a*). Referring to FIG. 10*b*, if the rotor 15 includes other end axial sections not in relation to the desired output rating (e.g. 75 and 80), additional end axial spacers 150 can be added to help align the stator core 105 with the rotor 15. For example, referring to FIGS. 3 and 10*b*, if the desired output rating is three-quarter horsepower, the stator 20 would be aligned with the axial sections 76, 77, 78, and 79. Two spacers 150 are used to cover the axial sections 75 and 80, respectively, of the rotor 15 not in relation to the desired three-quarter horsepower machine. The end-spacers can enhance support of assembly of the electrical machine in a uniform housing. The axial length of spacers 150 can vary with the constructions of the rotor 15 and stator 20 described above.

Thus, the invention provides, among other things, an electrical machine with reduced cogging and torque ripple. Various features and advantages of the invention are set forth in the following claims.

What is claimed is:

1. An electrical machine comprising:
    a stator including a stator core and windings;
    a rotor including one or more permanent magnets adapted to interact with the stator to promote rotation of the rotor about an axis, each permanent magnet being configured to include at least four axial sections having a magnetization pattern of alternating magnetic poles that are skewed with respect to the axis along substantially straight lines, the at least four axial sections including
        a first axial section having a first magnetization direction, having a first axial length, and having an arc of magnetization skew ($\beta$),
        a second axial section disposed adjacent to the first axial section, the second axial section having a second magnetization direction that is different from the first axial section, having a second axial length, and having the arc of magnetization skew ($\beta$),
        a third axial section disposed adjacent to the first axial section, the third axial section having a third magnetization direction that is different from the first magnetization direction, having a third axial length, and having the arc of magnetization skew ($\beta$),
        a fourth axial section disposed adjacent to the second axial section, the fourth axial section having a fourth magnetization direction that is different from the second magnetization direction, having a fourth axial length, and having the arc of magnetization skew ($\beta$); and
    wherein the first, second, third, and fourth magnetization directions define a continuous zig-zag pattern in the axial direction.

2. An electrical machine as set forth in claim 1 wherein the second axial length is substantially the same as the first axial length, and the fourth axial length is substantially the same as the third axial length.

3. An electrical machine as set forth in claim 2 wherein a sum of the first and second axial lengths is substantially unequal to a sum of the third and fourth axial lengths.

4. An electrical machine as set forth in claim 2 wherein a sum of the first and second axial lengths is substantially equal to a sum of the third and fourth axial lengths.

5. An electrical machine as set forth in claim 1 wherein a ratio range of a sum of the first axial length and the second axial length with a sum of the third axial length and the fourth axial length is between 0.75 and 1.5.

6. An electrical machine as set forth in claim 1 wherein the first magnetization direction is the same as the fourth magnetization direction.

7. An electrical machine as set forth in claim 1 wherein each permanent magnet further comprises
    a fifth axial section disposed adjacent to the third axial section, the fifth axial section having a fifth magnetization direction that is different from the third magnetization direction and having a fifth axial length, and
    a sixth axial section disposed adjacent to the fourth axial section, the sixth axial section having a sixth magnetization direction that is different from the fourth magnetization direction and having a sixth axial length, and
    wherein the first, second, third, fourth, fifth, and sixth magnetization directions define a continuous zig-zag pattern in the axial direction.

8. An electrical machine as set forth in claim 7 wherein the fifth axial section and the sixth axial section have the arc of magnetization skew ($\beta$).

9. An electrical machine as set forth in claim 7 wherein the second axial length is substantially the same as the first axial length, the fourth axial length is substantially the same as the third axial length, and the fifth axial length is substantially the same as the sixth axial length.

10. An electrical machine comprising:
    a stator including a stator core and windings;
    a rotor including a permanent magnet adapted to interact with the stator to promote rotation of the rotor about an axis, the permanent magnet being configured to include at least four axial sections, each of the four axial sections having a magnetization pattern of alternating magnetic poles that are skewed with respect to the axis along substantially straight lines, the at least four axial sections including
- a first axial section having a first magnetization direction, having a first axial length, and having an arc of magnetization skew ($\beta$),
- a second axial section disposed adjacent to the first axial section, the second axial section having a second magnetization direction that is different from the first axial section, having a second axial length, and having the arc of magnetization skew ($\beta$),
- a third axial section disposed adjacent to the first axial section, the third axial section having a third magnetization direction that is different from the first magnetization direction, having a third axial length, and having the arc of magnetization skew ($\beta$),
- a fourth axial section disposed adjacent to the second axial section, the fourth axial section having a fourth magnetization direction that is different from the second magnetization direction, having a fourth axial length, and having the arc of magnetization skew ($\beta$);
- wherein the first, second, third, and fourth magnetization directions define a continuous zig-zag pattern in the axial direction; and
- wherein a sum of the first and second axial lengths is substantially unequal to a sum of the third and fourth axial lengths.

11. An electrical machine as set forth in claim 10 wherein the rotor includes a plurality of permanent magnets configured to include the at least four axial sections.

12. An electrical machine as set forth in claim 11 wherein the second axial length is substantially the same as the first axial length, and the fourth axial length is substantially the same as the third axial length.

13. An electrical machine as set forth in claim 10 wherein each permanent magnet further comprises
- a fifth axial section disposed adjacent to the third axial section, the fifth axial section having a fifth magnetization direction that is different from the third magnetization direction and having a fifth axial length, and
- a sixth axial section disposed adjacent to the fourth axial section, the sixth axial section having a sixth magnetization direction that is different from the fourth magnetization direction and having a sixth axial length, and
- wherein the first, second, third, fourth, fifth, and sixth magnetization directions define a continuous zig-zag pattern in the axial direction.

14. An electrical machine as set forth in claim 13 wherein the fifth axial section and the sixth axial section have the arc of magnetization skew ($\beta$).

15. An electrical machine as set forth in claim 13 wherein the second axial length is substantially the same as the first axial length, the fourth axial length is substantially the same as the third axial length, and the fifth axial length is substantially the same as the sixth axial length.

16. An electrical machine having an axis, a first longitudinal line parallel to the axis, and a second longitudinal line parallel to the axis, the electrical machine comprising:
- a stator including a stator core and windings;
- a rotor including one or more permanent magnets adapted to interact with the stator to promote rotation of the rotor about the axis, the one or more permanent magnets being configured to include at least two axial sections, each of the two axial sections having a magnetization pattern of alternating magnetic poles that are skewed with respect to the axis along substantially straight lines, the at least two axial sections including
  - a first axial section having a first magnetization direction, having a first axial length, and having an arc of magnetization skew ($\beta$), the first magnetization direction including a first magnetization line traversing from the first longitudinal line to the second longitudinal line,
  - a second axial section disposed adjacent to the first axial section, the second axial section having a second magnetization direction that is different from the first axial section, having a second axial length that is different from the first axial length, and having the arc of magnetization skew ($\beta$), the second magnetization direction including a second magnetization line traversing from the second longitudinal line to the first longitudinal line; and
- wherein the first and second magnetization lines define a continuous zig-zag pattern in the axial direction that separates north and south magnetic poles.

17. An electrical machine as set forth in claim 16 wherein each of the one or more permanent magnets includes the at least two axial sections.

18. An electrical machine as set forth in claim 16 wherein the at least two axial sections further include
- a third axial section disposed adjacent to the first axial section, the third axial section having a third magnetization direction that is different from the first magnetization direction, having a third axial length that is different from the first axial length, and having the arc of magnetization skew ($\beta$).

19. An electrical machine as set forth in claim 18 wherein a center cross-section of the first axial section is the same as a center cross-section of the rotor.

20. An electrical machine as set forth in claim 18 wherein a ratio range of the first axial length with a sum of the second axial length and the third axial length is between 0.75 and 1.5.

21. An electrical machine as set forth in claim 18 wherein the first axial length is approximately equal to a sum of the second axial length and the third axial length.

22. An electrical machine as set forth in claim 18 wherein first axial length is substantially unequal to a sum of the second axial length and the third axial length.

23. An electrical machine as set forth in claim 18 wherein the third axial length is substantially the same as the second axial length.

24. An electrical machine having an axis, a first longitudinal line parallel to the axis, and a second longitudinal line parallel to the axis, the electrical machine comprising:
- a stator including a stator core and windings;
- a rotor including a permanent magnet adapted to interact with the stator to promote rotation of the rotor about the axis, the permanent magnet configured to form at least three axial sections, each of the three axial sections having a magnetization pattern of alternating magnetic poles that are skewed with respect to the axis along substantially straight lines and having an arc of magnetization skew that is substantially the same as the other axial sections, the at least three axial sections including
  - a first axial section having a first magnetization direction and a first axial length, the first magnetization direction including a first magnetization line traversing from the first longitudinal line to the second longitudinal line, a second axial section disposed adjacent to the first axial section, the second axial section having a second magnetization direction that is different from the first magnetization direction and having a second axial length, the second magnetization direction including a second magnetization line traversing from the second longitudinal line to the first longitudinal line, and a third axial section disposed adjacent to the first axial section, the third axial section having a third magnetization direction that is different than the first magnetization direction and having a third axial length that is substantially the same as the second axial length, the third magnetization direction including a third magnetization line traversing from the first longitudinal line to the second longitudinal line; and wherein the first, second, and third magnetization lines define a continuous zig-zag pattern in the axial direction that separates north and south magnetic poles.

25. An electrical machine as set forth in claim 24 wherein the rotor includes a plurality of permanent magnets adapted to interact with the stator to promote rotation of the rotor about an axis, the plurality of permanent magnets including the at least three axial sections.

26. An electrical machine as set forth in claim 24 wherein a ratio range of the first axial length with a sum of the second axial length and the third axial length is between 0.75 and 1.5.

27. An electrical machine as set forth in claim 24 wherein the first axial length is approximately equal to a sum of the second axial length and the third axial length.

28. An electrical machine as set forth in claim 24 wherein first axial length is substantially unequal to a sum of the second axial length and the third axial length.

29. An electrical machine as set forth in claim 24 wherein the at least four axial sections include a fourth axial section disposed adjacent to the second axial section, the fourth axial section having a fourth magnetization direction that is different from the second magnetization direction and having a fourth axial length, and a fifth axial section disposed adjacent to the third axial section, the fifth axial section having a fifth magnetization direction different that is from the third magnetization direction and having a fifth axial length that is substantially the same as the fourth axial length; and wherein the first, second, third, fourth, and fifth magnetization directions define a continuous zig-zag pattern in the axial direction.

30. An electrical machine as set forth in claim 29 wherein the fourth and fifth axial sections have an arc of magnetization skew that is substantially the same as the arc of magnetization skew of the first, second, and third axial sections.

* * * * *